(12) United States Patent
Soultanidis et al.

(10) Patent No.: US 9,061,268 B2
(45) Date of Patent: Jun. 23, 2015

(54) SYNTHESIS OF ULTRASMALL METAL OXIDE NANOPARTICLES

(75) Inventors: Nikolaos Soultanidis, Houston, TX (US); Michael S. Wong, Houston, TX (US)

(73) Assignee: William Marsh Rice University, Houston, TX (US)

( * ) Notice: Subject to any disclaimer, the term of this patent is extended or adjusted under 35 U.S.C. 154(b) by 280 days.

(21) Appl. No.: 13/702,321

(22) PCT Filed: Jun. 9, 2011

(86) PCT No.: PCT/US2011/039729
§ 371 (c)(1),
(2), (4) Date: Dec. 6, 2012

(87) PCT Pub. No.: WO2012/009070
PCT Pub. Date: Jan. 19, 2012

(65) Prior Publication Data
US 2013/0090511 A1    Apr. 11, 2013

Related U.S. Application Data

(60) Provisional application No. 61/359,232, filed on Jun. 28, 2010.

(51) Int. Cl.
*B01J 23/00* (2006.01)
*B01J 23/28* (2006.01)
(Continued)

(52) U.S. Cl.
CPC *B01J 23/30* (2013.01); *B01J 21/08* (2013.01); *B01J 23/22* (2013.01); *B01J 23/28* (2013.01); *B01J 27/188* (2013.01); *B01J 35/0013* (2013.01); *B01J 35/002* (2013.01); *B01J 35/1066* (2013.01); *B01J 37/0211* (2013.01); *B01J 37/033* (2013.01); *B01J 37/04* (2013.01);
(Continued)

(58) Field of Classification Search
USPC .......... 502/305, 312, 353; 977/700, 762, 773, 977/811, 896, 900
See application file for complete search history.

(56) References Cited

U.S. PATENT DOCUMENTS 6,143,211 A * 11/2000 Mathiowitz et al. ............ 264/4
6,752,979 B1 * 6/2004 Talbot et al. ............. 423/592.1
(Continued)

FOREIGN PATENT DOCUMENTS

| WO | 2005/097705 | * 10/2005 | ............ C04B 35/468 |
| WO | WO 2009065010 A2 | * 5/2009 | ............... B01J 13/00 |
| WO | 2012/009070 | * 1/2012 | ............... B01J 23/20 |

OTHER PUBLICATIONS

"Nano-supported metal oxides as a new type of catalyst structure," M. S. Wong et al. Prepr. Pap.-Am. Chem. Soc., Div. Pet. Chem. 2004, 49(1), p. 25.*

(Continued)

*Primary Examiner* — Patricia L Hailey
(74) *Attorney, Agent, or Firm* — Boulware & Valoir

(57) ABSTRACT

The invention generally relates to the ultrasmall $MO_x$ nanoparticles that are made in a solvothermal method using water soluble inorganic ammonium salt precursors of the $MO_x$ and organic amines, and slow heating to generate uniform ultrasmall $MO_x$ nanoparticles of 5 nm or less, as well as methods to make and use same.

22 Claims, 6 Drawing Sheets

(51) Int. Cl.

| | |
|---|---|
| B01J 23/30 | (2006.01) |
| B01J 31/34 | (2006.01) |
| B01J 31/36 | (2006.01) |
| B01J 37/04 | (2006.01) |
| B01J 37/06 | (2006.01) |
| B01J 21/08 | (2006.01) |
| B01J 23/22 | (2006.01) |
| B01J 27/188 | (2006.01) |
| B01J 35/00 | (2006.01) |
| B01J 35/10 | (2006.01) |
| B01J 37/02 | (2006.01) |
| B01J 37/03 | (2006.01) |
| B01J 37/08 | (2006.01) |
| B82Y 30/00 | (2011.01) |
| C01G 31/02 | (2006.01) |
| C01G 39/02 | (2006.01) |
| C01G 41/02 | (2006.01) |
| C01B 13/18 | (2006.01) |
| B82Y 40/00 | (2011.01) |

(52) U.S. Cl.
CPC ............. *B01J 37/086* (2013.01); *B82Y 30/00* (2013.01); *B82Y 40/00* (2013.01); *Y10S 977/762* (2013.01); *Y10S 977/773* (2013.01); *Y10S 977/811* (2013.01); *Y10S 977/896* (2013.01); *Y10S 977/90* (2013.01); *C01G 31/02* (2013.01); *C01G 39/02* (2013.01); *C01G 41/02* (2013.01); *C01B 13/18* (2013.01); *C01P 2002/50* (2013.01); *C01P 2004/04* (2013.01); *C01P 2004/16* (2013.01); *C01P 2004/32* (2013.01); *C01P 2004/52* (2013.01); *C01P 2004/64* (2013.01); *C01P 2006/12* (2013.01); *C01P 2006/14* (2013.01)

(56) References Cited

U.S. PATENT DOCUMENTS

| | | | |
|---|---|---|---|
| 7,407,527 B2 * | 8/2008 | Hyeon | 75/351 |
| 7,547,347 B2 * | 6/2009 | Yang et al. | 75/351 |
| 2004/0247503 A1 * | 12/2004 | Hyeon | 423/1 |
| 2005/0164132 A1 * | 7/2005 | Moll et al. | 430/322 |
| 2010/0248945 A1 * | 9/2010 | Eijsbouts-Spickova et al. | 502/74 |
| 2014/0096964 A1 * | 4/2014 | Chakraborty et al. | 166/279 |

OTHER PUBLICATIONS

"MoO3-x-Based Hybrids with Tunable Localized Surface Plasmon Resonances: Chemical Oxidation Driving Transformation from Ultrathin Nanosheets to Nanotubes," Qingquan Huang et al. Chemistry—A European Journal, 2012, 18, pp. 15283-15287.*

"Cluster-Based Self-Assembly Route toward MoO3 Single-Walled Nanotubes," Shi Hu et al. Chemistry—A European Journal, 2010, 16, pp. 1889-1896.*

"Single-Walled MoO3 Nanotubes," Shi Hu et al. J. Am. Chem. Soc. 2008, 130, pp. 8126-8127.*

* cited by examiner

SYNTHESIS OF ULTRASMALL METAL OXIDE NANOPARTICLES

PRIOR RELATED APPLICATIONS

This invention is a National Filing under 35 U.S.C. §371 of International Application PCT/US11/39729, filed on Jun. 09, 2011, which claims priority to U.S. 61/359,232 filed on Jun. 28, 2010. Each of these patent applications is incorporated by reference in its entirety.

FEDERALLY SPONSORED RESEARCH STATEMENT

This invention was made with government support under Grant No: CBET-0609018 awarded by the National Science Foundation. The government has certain rights in the invention.

REFERENCE TO MICROFICHE APPENDIX

Not applicable.

FIELD OF THE INVENTION

The invention relates to the controlled synthesis of ultrasmall metal oxide ($MO_x$) nanoparticles through a new synthetic route.

BACKGROUND OF THE INVENTION

Metal-oxide ($MO_x$) particles, such as $TiO_2$ and ZnO, serve many functions in polymeric materials. Traditionally, they have been used as pigments to enhance the appearance and improve the durability of polymeric products, and usually they have been considered to be inert. As nanosized particles, these materials exhibit broad band UV absorption, a benefit that has long been exploited in sunscreen applications.

Metal-oxide nanoparticles are also useful for a large variety of more sophisticated applications that become possible when uniform nanoparticles become available. Such applications include uses in catalysis, as sensors, optoelectronic materials and in environmental remediation. Controlled synthesis of metal oxide nanoparticles is essential for such applications, where uniformity of size and shape of $MO_x$ nanoparticles is needed to improve their usefulness.

The conventional prior art preparation techniques for $MO_x$ NPs typically use organometallic precursors to form NPs with diameters greater than 2 nm. With the prior art methodology, only larger structures such as nanorods, nanotubes, nanoneedles, and nanowires have been reported in literature.

For example, Gu et al. (2002) synthesized tungsten oxide ($WO_x$) nanowires (5 nm×500 nm) by hydrogen treatment of W substrates at 700° C. Lee et al. (2003) synthesized $WO_x$ nanorods (3.5 nm×31 nm) using an organic precursor and an oxidation agent a 270° C. Hudson et al. (2003) synthesized $WO_x$ nanoneedles (10-60 nm) by pyrolysis of an acidified precursor in a copolymer at 900° C. Zhang et al. (2004) synthesized $WO_x$ nanorods (20 nm×1-2 µm) by electrochemical etching on W filaments; and Seo et al. (2005) synthesized $WO_x$ nanorods (4.5 nm×30 nm) using $WCl_4$ and a mixture of two organic surfactants (oleylamine and oleic acid) at 350° C.

All the above methods failed to synthesize ultrasmall tungsten oxide nanoparticles because of (1) the W precursor used and/or (2) the surfactant chosen and/or (3) the reaction conditions.

Similar to tungsten oxide, no one has reported the synthesis of ultrasmall vanadium oxide ($VO_x$) nanoparticles. Lutta et al. (2005) reported the synthesis of $VO_x$ nanofibers (140 nm×1 µm) using ammonium vanadate and acetic acid after heating >250° C. Viswanathamurthi et al. (2003) reported the synthesis of $VO_x$ nanofibers prepared by electrospinning using vanadium sol and polyvinylacetate. Spahr et al. (1998 and 1999) reported the synthesis of $VO_x$ nanotubes (50 nm×100 nm) via hydrolysis using vanadium oxide triisopropoxide and hexadecylamine (180° C. and 10 bar). Muhr et al. (2000) reported the synthesis of $VO_x$ nanotubes (15-100 nm×5-50 nm) via hydrolysis using alkyl amines and vanadium alkoxide; and Niederberger et al. (2000) reported the synthesis of $VO_x$ nanotubes (60-100 nm×1-3 µm) via a 2-step hydrolysis-hydrothermal treatment using $VOCl_3$ and $V_2O_5$.

Likewise, no one has demonstrated an ability to synthesizing ultrasmall molybdenum oxide ($MoO_x$) nanoparticles. Phuruangrat et al. (2009) reported the synthesis of $MoO_x$ nanowires (50 nm×10 µm) using ammonium metamolybdate and CTAB using a microwave-assisted hydrothermal process. Zach et al. (2000) reported the synthesis of $MoO_x$ nanowires (15-1000 nm×500 nm) by electrodeposition of $MoO_x$ on graphite. Zhou et al. (2003) also reported the synthesis of $MoO_x$ nanowires (50-120 nm×4 µm) by heating Mo at 1100° C. on a silica substrate. Du et al. (2008) reported the synthesis of $MoO_x$ nanospheres (25-75 nm) using 3-mercaptopropyltrimethoxysilane using ultrasonic irradiation, and Niederberger et al. (2001) reported the synthesis of $MoO_x$ nanofibers (50-150 nm×15 µm) using sodium molybdate and dodecyl- and hexadecylamine in a template-directed approach.

As with tungsten, all the above methods for synthesizing vanadium and molybdenum nanoparticles were incapable of synthesizing ultrasmall nanoparticles due to thermodynamic or synthetic limitations.

Therefore, what is needed in the art is a method of making relatively uniform $MO_x$ nanoparticles of size less than 5 nm, preferably less than 2 nm, with narrow size distribution and control over the morphology and metal content of the nanoparticles.

SUMMARY OF THE INVENTION

The invention generally relates to the solvothermal synthesis of ultrasmall $MO_x$ nanoparticles such as $WO_x$, $MoO_x$, $VO_x$ and doped (more than one type of metal) variations of those using water soluble inorganic ammonium salts and an excess of organic amines coupled with slow heating to a temperature that is less than the boiling temperature of the organic amine.

This new synthetic route provides nanoparticles with approximately 20-40 metal atoms per cluster and sizes of 2 nm or less. This method also offers fine control over particle dimensions and the ability to dope the particles with a desired ratio of different metals. Such control over the synthesis of these nanoparticles provides the ability to selectively tailor them for specific applications in a variety of fields.

These ultrasmall metal oxide nanoparticles have potential utility as catalysts in the petroleum industry, environmental remediation, and fine chemical synthesis. The ability to selectively dope the metal oxide structure with other metals is of particular interest in catalytic applications because the material can thereby be tuned for the formation of a specific product. Other applications include those in the energy storage/conversion and electrochromic sensing fields.

FIG. 1 presents the experimental setup used for the proposed method of synthesizing ultrasmall $MO_x$ nanoparticles. Generally speaking, a water soluble, inorganic ammonium oxometalate precursor is added to an 5-100 weight fold excess of surfactant, in this case oleylamine, and slowly heated up to 250-270° C. until the ammonium oxometalate precursor structure collapses and the nucleation stage generates ultrasmall $MO_x$ nanoparticles of size<5 nm and with approximately 20-40 metal atoms per cluster.

Optionally, 1,12-dodecanediol can be added if larger rod shaped nanoparticles are desired or trimethylamine N-oxide can be added if ultrasmall nanoparticles (1.0±0.2 nm) are desired. Larger particles can also be acquired by increasing the heating rate in the presence of non-reaction organic solvents such as 1-octadecene (ODE).

The concentrations presented in FIG. 1 demonstrate the basic recipe that generated ultrasmall $MO_x$ nanoparticles. Variations on this method were also made. The procedure was simple and more economical than the prior art methods mentioned. Further, the resulting particles were very small, uniform and showed great catalytic potential.

Generally speaking, the invention is a method of making ultrasmall metal oxide nanoparticles, comprising; placing a water soluble, inorganic ammonium oxometalate precursor in a reactor, adding an excess of an amine surfactant to said reactor, and optionally adding diols, amine oxides, or other modifying or doping agents to said reactor. The reactor is slowly heated while stirring under oxygen free conditions and then held at the final temperature for 1-3 hours until the ammonium oxometalate precursor structure collapses and the nucleation stage generates ultrasmall metal oxide nanoparticles of average size≤5 nm and with about 20-40 metal atoms per nanoparticle.

In preferred embodiments, the size distribution of nanoparticles is narrow or monodispersed, as measured by the relative standard deviation (RSD=standard deviation±mean). When RSD<5%, the colloidal system is considered to be monodispersed. When RSD is between 5 and 10%, the system is considered to be narrowly dispersed; above 10%, it is broadly dispersed.

In another embodiment, the method comprises placing 1 part of water soluble, inorganic ammonium oxometalate precursor, which is fully oxidized and has structural stability up to about 250° C., in a reactor; adding 14-20 parts of oleylamine to said reactor, preferably 17 parts, optionally adding 0-1 part 1,12-dodecandiol or 0-1 part of trimethylamine N-oxide (TANO) to said reactor, preferably 0.5 parts, and slowly heating the reactor while stirring under oxygen free conditions until the reactor reaches about 250-270° C. The reactor is held at about 250-270° C. for 1-3 hours until the ammonium oxometalate precursor structure collapses and the nucleation stage generates ultrasmall metal oxide nanoparticles of average size<5 nm and with about 20-40 metal atoms per nanoparticle.

The nanoparticles can then be collected by precipitation, filtration, gravity settling or any other method, washed, dried and used as needed. The method can produce $WO_x$, $MoO_x$, $VO_x$ or a doped variations thereof, which can be used as is or further modified for particular applications. For example, the nanoparticles can be conjugated to a solid support by known methods and used as a catalysts, particularly for metathesis reactions, e.g., metathesis of propylene.

DESCRIPTION OF EMBODIMENTS OF THE INVENTION

The use of the word "a" or "an" when used in conjunction with the term "comprising" in the claims or the specification means one or more than one, unless the context dictates otherwise.

The term "about" means the stated value plus or minus the normal margin of error of the measurement, or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The following abbreviations were used herein:

| | |
|---|---|
| AFM | Atomic force microscopy |
| AMM | Ammonium metamolybdate tetrahydrate $(NH_4)_6Mo_7O_{24} \cdot 4H_2O$ |
| AMT | Ammonium metatungstate $(NH_3)H_8W_{12}O_{40} \cdot xH_2O)$ |
| AMV | Ammonium metavanadate $NH_4VO_3$ |
| APT | Ammonium paratungstate $(NH_4)10H_2(W_{12}O_{42}) \cdot xH_2O$ |
| BF | Bright field |
| $C_2^=$ | Ethylene |
| $C_4^=$ | 2-Butene |
| CTAB | Cetyl trimethylammonium bromide |
| DSC | Differential scanning calorimeter |
| DTAB | Dodecyl trimethyl ammonium bromide |
| FTIR | Fourier transform infrared spectroscopy |
| HOPG | High Ordered Pyrolytic Graphite |
| HR-TEM | High resolution transmission electron microscopy |
| Mo | Molybdenum |
| $MoO_x$ | Molybdenum oxide |
| $MO_x$ | Metal oxides |
| NPs | Nanoparticles |
| ODE | 1-octadecene |
| PTA | Phosphotungstic acid hydrate $H_3[P(W_{12}O_{40})] \cdot xH2O$ |
| SAD | Selective area diffraction |
| SSA | Specific surface area |
| STEM | Scanning transmission electron microscopy |
| TANO | Trimethyl amine N-oxide |
| TEM | Transmission Electron Microscopy |
| TGA | Thermogravimetric analysis |
| V | Vanadium |
| $VO_x$ | Vanadium oxide |
| W | Tungsten |
| $WO_x$ | Tungsten oxide |
| XRD | X-ray diffraction |

Prior art synthetic methods tested in our lab demonstrated poor control over particle shape and morphology. However, the new synthetic method demonstrated herein can produce any size particle from ultrasmall spherical particles to larger rod shaped structures, depending on the addition of select chemicals.

Figure 1:
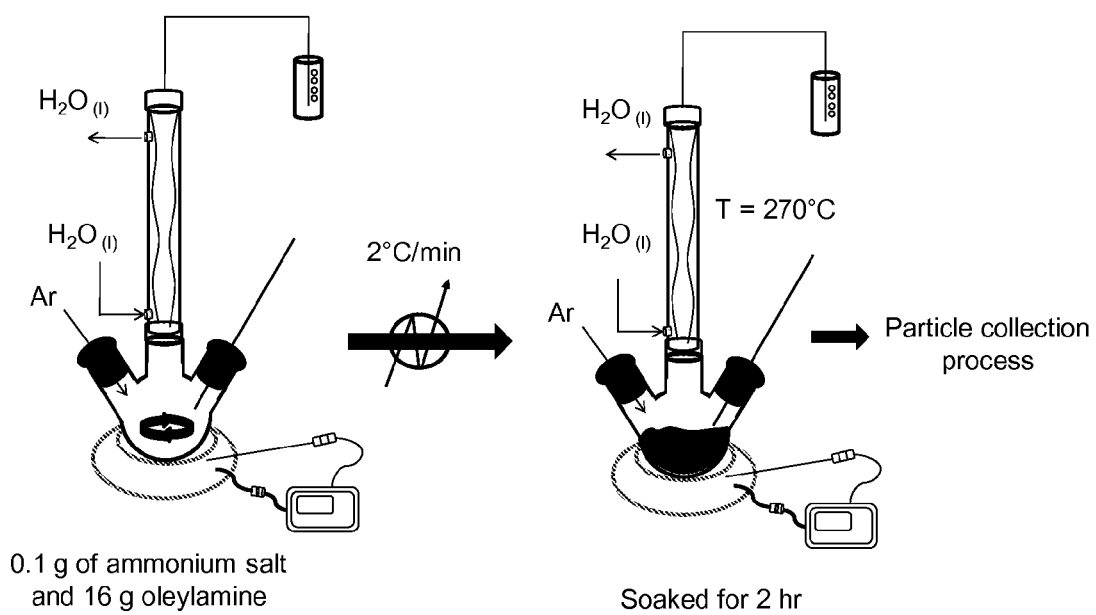
FIG. 1: Experimental setup and procedure for the synthesis of ultrasmall $MO_x$ nanoparticles.

The methodology is illustrated in FIG. 1. In more detail, a water soluble ammonium salt $MO_x$ precursor (about 0.1 g) is placed in the reactor with an excess of an amine surfactant, such as oleylamine. An optional non-reacting organic solvent such as ODE can also be added and in combination with adjusting the reaction conditions leads to the generation of larger rod shaped particles. The reactor is slowly heated until about 270° C. which allows decomposition of the precursor structure and nucleation to begin, at which point the mixture is soaked for a few hours allowing some amount of growth. The nanoparticles are then collected.

The synthetic method presented here follows a solvothermal path between water soluble inorganic salts and organic amines to generate organometallic complexes. More specifically, bonding between the amine group of oleylamine and the (poly)oxometalate core ((poly)atomic ion) of an ammonium salt generates a series of core-shell structures where the core is a metal oxide of spherical shape and the shell is oleylamine. Primary amines like oleylamine exhibit enhanced basic properties with respect to ammonia, the base form of the ammonium cation ($NH_4^+$) of ammonium salts, due to the inductive effect of the 18 carbon atom chain.

Figure 2:
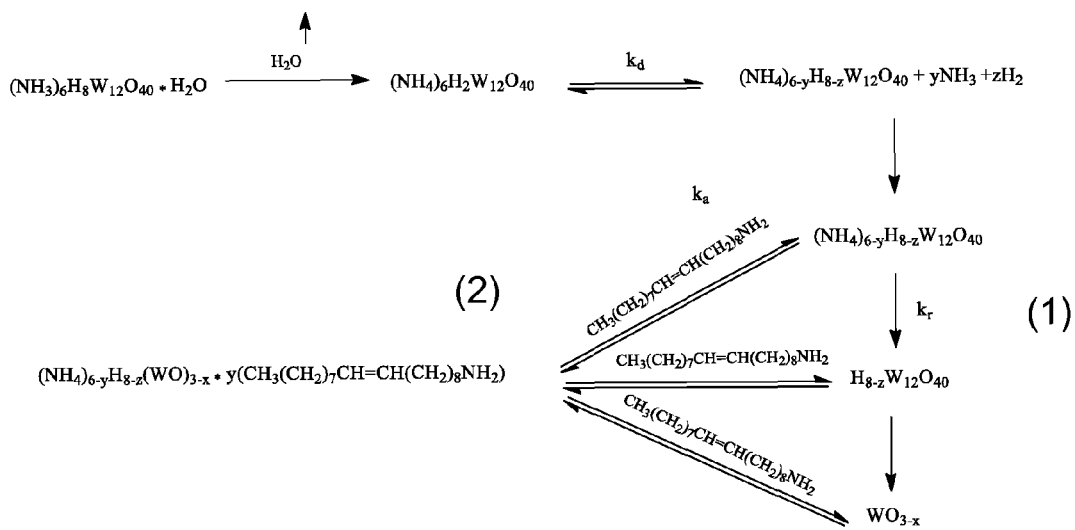
FIG. 2: Proposed particle synthesis mechanisms.

The core-shell structures generated are soluble in organic solvents like toluene, hexane and chloroform in contrast to their ammonium precursors. After the dissociation of the ammonium cation that generates ammonia and hydrogen, two reaction pathways are considered: (1) the reduction of the polyoxometalate; and/or (2) its association with oleylamine (FIG. 2).

The reasons for using an excess of the aliphatic amines is to (1) ensure stabilization and avoid aggregation of the $WO_x$ NPs and (2) to ensure good mixing and heat transfer properties within the 3-neck batch reactor used. It was also noticed that by using a non-reacting solvent such as 1-octadecene and by increasing the heating rate, growth of the synthesized particles generated larger rod-shaped structures.

Multiple washes with acetone of the acquired particles and redispersions in toluene also led to some particle aggregation due to the removal of oleylamine molecules from the particle shell. Solvents like chloroform can be used instead of toluene as a solvent for dispersing the collected particles.

Variations on the above described method include:
The general use of heteropolyanionic compounds as precursors.
Other nitrogen-containing surfactants besides oleylamine.
Particle sizes of larger than 2 nm should be possible, for example up to 5-10 nm.
Other shapes should be possible.
nanoparticles of mixed metal compositions.

The steps of the method are described in additional detail in the examples. The examples are illustrative only, and are not intended to unduly limit the scope of the invention.

EXAMPLE 1

Metal Oxide Synthesis

Selection of the ammonium salt metal precursor. The selection of the ammonium salt metal precursor that is water-soluble and not organic-soluble is quite important, because otherwise the use of an organic solvent will prevent the synthesis of ultrasmall nanoparticles due to the dissolution of the metal or $MO_x$ precursor.

Generally, the precursor should be fully oxidized and have structural stability up to about 260° C. due to its Keggin structure conformation. Keggin structure is the best known structural form for heteropoly acids. It is the structural form of α-Keggin anions, which have a general formula of $[XM_{12}O_{40}]n-$, where X is the heteroatom (most commonly are $P^{5+}$, $Si^{4+}$, or $B^{3+}$ or simply $H^+$), M is the addenda atom (most common are molybdenum and tungsten), and O represents oxygen. The structure self-assembles in acidic aqueous solution and is the most stable structure of polyoxometalate catalysts. At about 250° C. the precursor Keggin structure collapses and the nucleation stage generates ultrasmall $MO_x$ nanoparticles.

The following precursors have successfully been tested in our method: ammonium metatungstate (AMT, $(NH_3)H_8W_{12}O_{40} \cdot xH_2O$), ammonium paratungstate (APT, $(NH_4)_{10}H_2(W_{12}O_{42}) \cdot xH_2O$), phosphotungstic acid hydrate (PTA, $H_3[P(W_{12}O_{40})] \cdot xH_2O$), ammonium metamolybdate tetrahydrate (AMM, $(NH_4)_6Mo_7O_{24} \cdot 4H_2O$), ammonium metavanadate (AMV, $NH_4VO_3$) and other ammonium oxometalate precursors.

The following precursors can also be considered for synthesizing ultrasmall nanoparticles: ammonium pentaborate octahydrate $(NH_4)_2B_{10}O_{16} \cdot 8H_2O$, ammonium hexachloroosmate(IV) $(NH_4)_2OsCl_6$, ammonium chromate $(NH_4)_2CrO_4$, ammonium perrhenate $NH_4ReO_4$, ammonium dihydrogenphosphate $NH_4H_2PO_4$, ammonium phosphomolybdate hydrate $(NH_4)_3PMo_{12}O_{40} \cdot xH_2O$, ammonium hexachloroiridate(IV) $(NH_4)_2IrCl_6$, ammonium tetrathiomolybdate $(NH_4)_2MoS_4$, ammonium hexachloropalladate(IV) $(NH_4)_2PdCl_6$, ammonium hexachlororhodate(III) $(NH_4)_3RhCl_6$, and ammonium dichromate $(NH_4)_2Cr_2O_7$, but have not yet been tested.

Combination with an amine surfactant. The selection of an appropriate surfactant is also important. Thus far, oleylamine is the only surfactant we have found that has lead to the formation of ultrasmall nanoparticles. Other surfactants, including dodecylamine, hexadecylamine, oleic acid, CTAB, and DTAB, were investigated but they did not result in the formation of ultrasmall nanoparticles or gave larger particles. Dodecylamine and hexadecylamine generated unstable rod-shaped particles and oleic acid failed to produce nanoparticles at all.

Two factors were identified for oleylamine's unique properties. First, the increased basicity or reduction ability of the primary amine group, i.e. the ability of oleylamine to accept electrons or donate protons, is ideal for this specific synthesis because oleylamine acts as a stabilizing ligand and provides a strong reductive environment. This effect allows the oleylamine molecules to both decompose the polyanionic core and at the same time act as ligand to capture the oxide core. Second, the higher boiling point of oleylamine and the fact that it is liquid at room temperature (due to the carbon double-bond in the hydrocarbon tail group) opposite to dodecylamine and the other tested amines, allows synthesizing particles at temperatures between 250-270° C. without evaporating the amine and also when the sample is cooled down at room temperature it remains completely in the liquid phase. Other amines, which have not been tested here, with similar properties, should generate particles of similar or slightly different features. For example, secondary and tertiary amines are less basic that primary amines, but more basic than ammonia, and thus amine surfactants with secondary and tertiary amine groups should lead to particles.

Oleylamine was thus added to the selected precursors at the desired concentration. The reactor volume was always set to 20 mL, and about 17 g of oleylamine was added to achieve proper mixing conditions and to avoid the formation of hotspots. A magnetic stirring bar and thermometer was added to the reactor. The openings of the 3 neck reactor were sealed with stoppers and purged with argon at the desired rate to prevent oxidation.

Depending on the desired characteristics of the desired nanoparticles, an optional addition of 0.05 g of 1,12-dodecanediol or trimethylamine N-oxide (TANO) was combined with the mixture before heating. 1,12-dodecanediol resulted in the formation of larger, rod-shaped NPs with dimensions of about 3-7 nm×20-60 nm. The 1,12-dodecanediol guides the growth of nanorods, perhaps through its binding to the growing nanorod surface. TANO resulted in the formation of smaller, spherical nanoparticles with a size distribution of 0.8-1.2 nm. TANO is an oxidation agent and seems to prevent the intense reduction that took place during the synthesis process. This results in clusters of 18-24 W atoms, leading to smaller NPs. The role of TANO is to release atomic oxygen in the organic mixture; the oxygen could be suppressing particle growth due to oxidized nanoparticles being less reactive than reduced ones. There is no obvious effect on the particle morphology or structure in the presence of TANO.

Heating and Soaking. The reactor was heated at a rate of 2° C./min using a heating mantel until a final temperature of 270° C. The mixture was then soaked at 270° C. for 2 hours. This process took place under constant argon flow of 10 cc/min to avoid the possibility of uncontrolled oxidation, but any inert gas could be used for this purpose.

The temperature was increased slowly at a rate of 2° C./min to avoid any overflow or liquid expansion caused by the evaporation of the water molecules present in the precursor's structure. Faster heating ramp rates in the presence of non-reacting solvents leaded to the formation of larger particles.

The maximum temperature was set to 270° C. because higher or lower temperatures resulted in poor homogeneity of the particles and/or poor yields. Moreover, the boiling point of pure oleylamine is ~300° C. Reactor temperatures near 300° C. will cause evaporation of oleylamine, thus introducing a problem to the synthesis.

Cool and collect. The reacted mixture was left to cool down at room temperature prior to any further steps. After cooling, the mixture (formed nanoparticles, excess oleylamine) was treated with acetone to precipitate the nanoparticles. Other options were ethanol or a volumetric mixture of methanol:chloroform at a ratio of 1:1. The mixture was centrifuged at 4000 rpm for 2 hours to completely precipitate and separate the nanoparticles from the excess liquid. After removing the remaining liquid (oleylamine and acetone), the nanoparticles were air dried at room temperature for approximately 1 day and were dispersed in organic non-polar solvents such as toluene.

EXAMPLE 2

Characterization of Metal Oxides

To determine the particle composition and morphology the following characterization tools were used.

TEM-STEM. Bright field (BF) images and selective area diffraction (SAD) of the samples were obtained using a JEOL 2000FX TEM operating at 200 kV. High resolution TEM (HRTEM) imaging were performed on a 200 kV JEOL 2200FS (S)TEM equipped with a CEOS probe $C_s$-corrector.

AFM Atomic force microscopy (AFM) measurements were performed on a digital instrument (Nanoscope IIIA). Toluene dispersed nanoparticles were deposited and spin-coated onto high ordered pyrolytic graphite (HOPG) for optimal dispersion properties. The HOPG surface was completely flat with variations<1 nm along the vertical z-axis making it easy to detect smaller particles.

TGA. Thermogravimetric analysis was performed on a Q600 TA instrument that allowed us to calculate the organic content of the particles. All samples were previously dried at room temperature overnight and were heated up to 800° C. at a ramp rate of 3.0° C./min under flowing air (100 cc/min).

TGA-FTIR. Combined TGA-FTIR experiments were performed to study the decomposition of AMT in the presence of oleylamine. Similar to the synthesis conditions, the sample was heated under continuous flowing argon and the outgases were passed to a Nicolet FTIR. The connection line between the TGA and the FTIR was heated at (120° C.) to prevent any condensation. In this case, sample preparation consisted of drying at room temperature overnight and heating up to 270° C. at a ramp rate of 2.0° C./min under flowing argon (50 cc/min). The system was not operated under vacuum conditions resulting in $CO_2$ concentrations appearing in the IR-spectra. Since no reflux condenser was used in this case, partial decomposition and incomplete burn off the oleylamine was unavoidable.

Depositing to Solid Support. In order to make the $MO_x$ nanoparticles easier to manipulate for the $N_2$ physiosorption and catalysis studies, they were coupled to a solid support.

The $WO_x$ nanoparticles were dissolved to a total volume of 40 ml and were placed in a 200 ml beaker. 1 g of Colloidal $SiO_2$ (specific surface area (SSA) of 270 $m^2/g$ and pore volume ($V_p$) of 1.44 $cm^3/g$) was inserted in the beaker and was stirred in a vacuum hood at 40° C. overnight. The resulting gel-like material was further heated at 80° C. until completely dried followed by calcination temperature at a rate of 3° C./min up to 200-600° C. for 3 hours.

$N_2$-physisorption. $N_2$-physisorption studies on $SiO_2$ supported $WO_x$ nanoparticles and impregnated samples were performed on a Micromeritics ASAP 2010. Specific surface areas were collected according to the previously reported protocol using the Brunauer-Emmett-Teller (BET) model and the pore volumes were recorded at $P/P_0=0.985$, where P is the measured pressure and $P_0$ is the saturation pressure of $N_2$ at −196° C. All BET C values were in the accepted range 50-300, representative of material that lack microporosity (further confirmed through t-plot analysis). $N_2$ adsorption-desorption isotherms were of type IV, indicative of mesoporosity.

Figure 3:
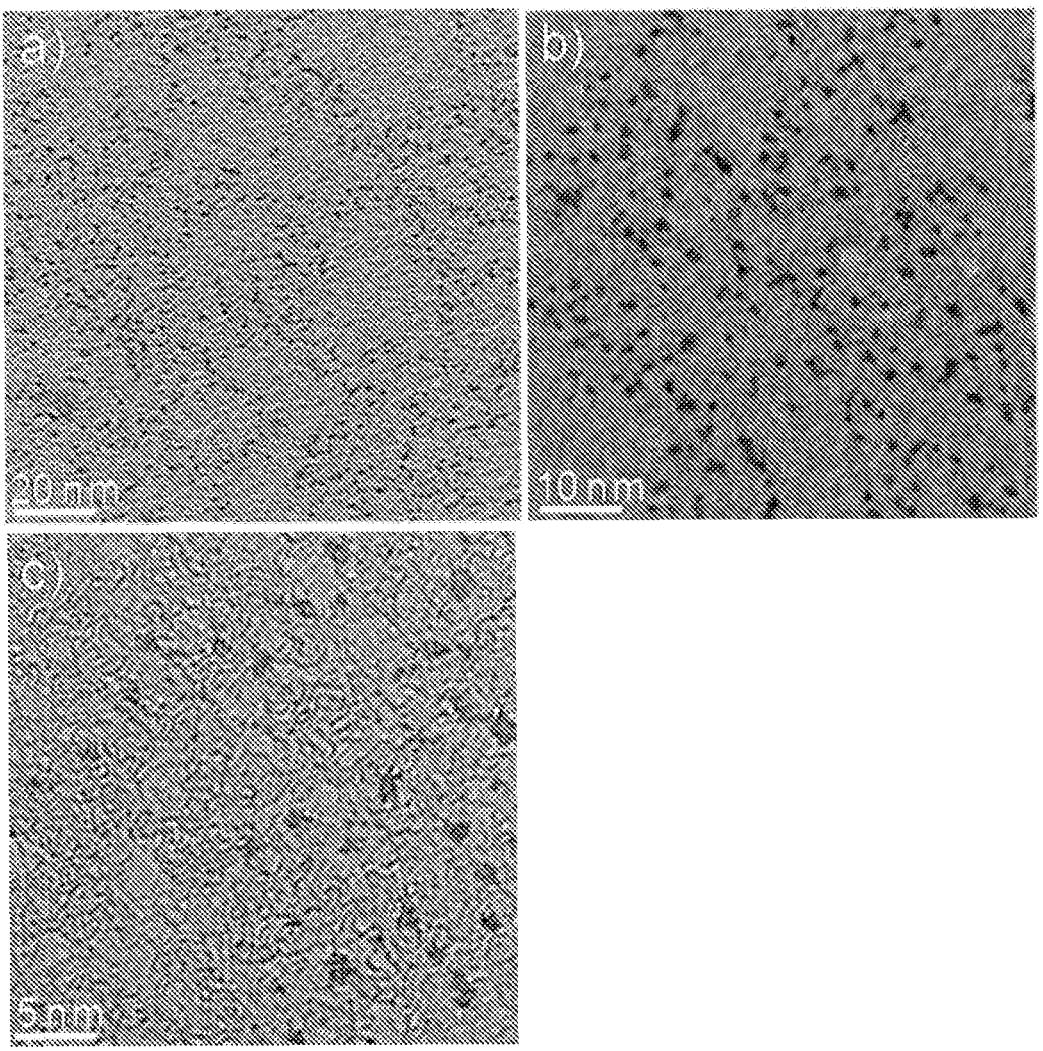
FIG. 3: Representative TEM (a & b) and HR-TEM (c) of $WO_3$ nanoparticles.

FIG. 3 provides images of $WO_x$ nanoparticles taken by TEM and HR-TEM. From the transmission electron microscopy (TEM) images presented in FIGS. 3a and 3b and the high resolution TEM (HR-TEM) image in FIG. 2c, spherical or raft-shaped particles of 1.6±0.45 nm (estimated for 1000 particles using ImageJ) were observed.

Figure 4:
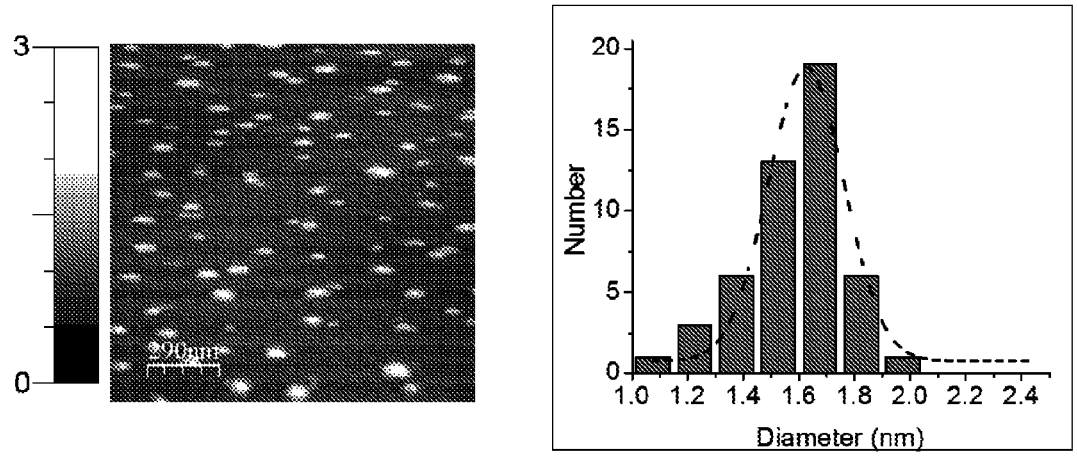
FIG. 4: AFM imaging of $WO_x$ nanoparticles deposited on highly ordered pyrolytic graphite (HOPG) and particle size distribution.

The $WO_x$ nanoparticle distribution was easily estimated for higher particle concentrations using atomic force microscopy (AFM). For AFM imaging, the $WO_x$ nanoparticles were deposited on high ordered pyrolytic graphite (HOPG). In FIG. 4, the $WO_x$ nanoparticles showed a narrow particle size distribution, with mean size of 1.6 nm and a standard deviation of 0.27 nm. AFM is a faster and more accurate way of estimating the particle size distribution. Also, the AFM images shown here excluded the possibility of electron beam initiated (in situ) synthesis to be occurring.

Figure 5:
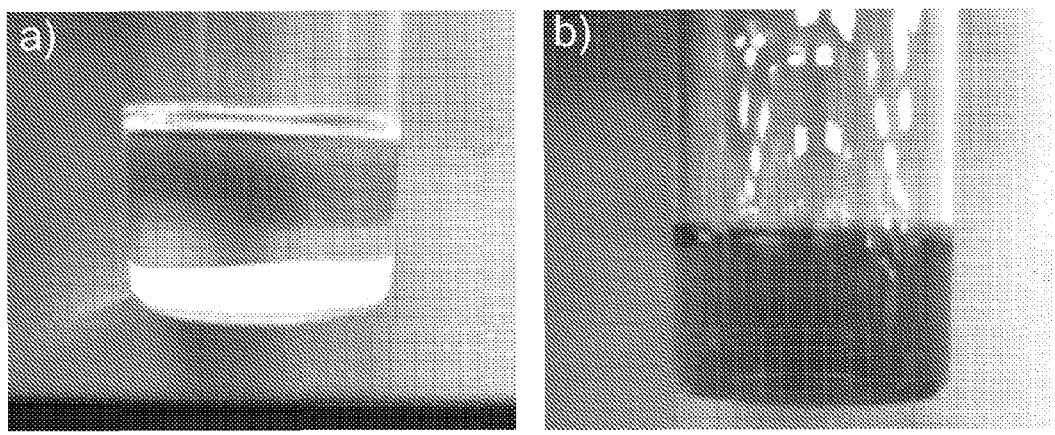
FIG. 5: Ammonium metatungstate precursor (AMT, $(NH_3)$ $H_8W_{12}O_{40} \cdot xH_2O$) is insoluble in toluene (A), but the $WO_x$ nanoparticles are soluble in toluene (B). This fact greatly simplifies production and purification of the $MO_x$ nanoparticles.

FIG. 5 presents images of the $WO_x$ nanoparticles dispersed in organic solvents such as toluene (FIG. 5b), compared to AMT precursor that is insoluble in toluene (FIG. 5a). This means that the $WO_x$ nanoparticles have organic ligands attached (oleylamine), which allows the nanoparticles to remain dispersed in the organic solvent without aggregating. TGA data (not shown) indicated that there were approximately 16-20 oleylamine molecules per $WO_x$ nanoparticle.

From the TGA and DSC data it was calculated that complete removal of oleylamine was achieved at ~500° C. Four different batches using constant ramp rate were performed to verify the amount of organics, and was found to be consistently ~48%. Based on that, the remaining 52% corresponds to the inorganic content.

The overall nanoparticle yield was found to be 92±5% (relative standard deviation, n=30). The 5% offset corresponds to minor yield differences in 30 batches and was relatively small, which indicates the good reproducibility of the method.

When the synthesis takes place in the presence of 0.05 g of trimethyl amine N-oxide (TANO), the particle size distribution consistently reduced to about 0.8-1.2 nm (FIG. 6a). This is a desired size for ideal catalytic activity as reported earlier. TANO is an oxidation agent and in this case seemed to prevent the intense reduction that took place during the synthesis process, resulting in clusters of 18-24 W atoms. We believe that this observation reveals a method of controlling the number of atoms per $WO_x$ cluster.

Figure 6:
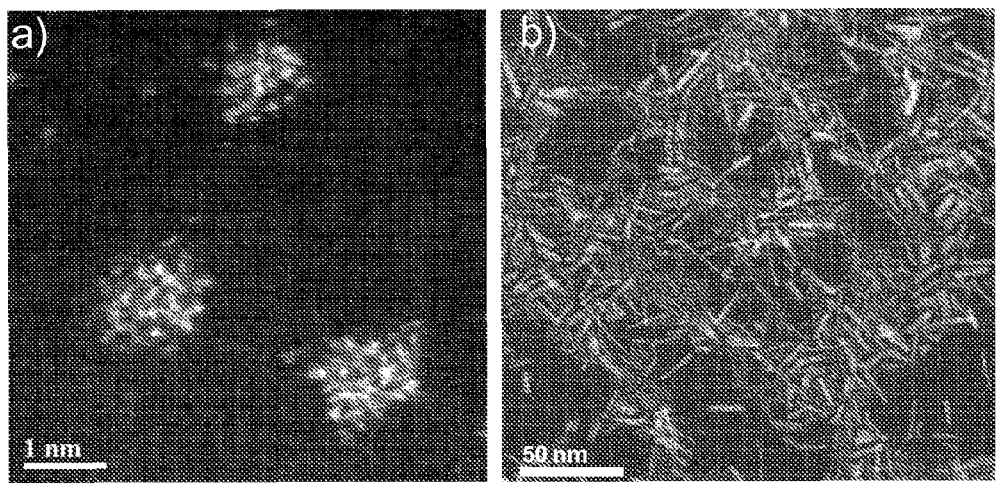
FIG. 6: STEM images of $WO_x$ nanoparticles. Ultra-small $WO_x$ nanoparticles formed by addition of 0.05 g of N-oxide to the initial slurry solution (a) and rod-shaped $WO_x$ NPs formed by addition of 0.05 g of 1,12-dodecanediol to the initial slurry solution (b).

The diversity of the method was demonstrated in FIG. 6. In FIG. 6a, trimethylamine N-oxide (TANO) was added to the mixture. The resulting NPs were ultrasmall (0.8-1.2 nm) spherical NPs. In FIG. 6b $WO_x$ nanorods (5±1 nm×25±5 nm) were synthesized by replacing TANO with same quantity of 1,12-dodecanediol. A similar effect was noticed by adding a non-reacting solvent such as ODE (without adding TANO or 1,12-dodecanediol) and by increasing the heating rate up to 30° C./min and soaking at 270° C. for 2 hours. The process took in place under constant argon flow of 10 cc/min.

Molybdenum oxide ($MoO_x$) NPs were synthesized similar to $WO_x$. Ammonium metamolybdate tetrahydrate was used as precursor (0.1 g) and 17 g of oleylamine following the standard procedure mentioned earlier. The diameter of the $MoO_x$ NPs was about 1.2-1.8 nm. Each particle contained about 30-48 atoms.

Vanadium oxide ($VO_x$) nanoparticles were synthesized similar to $WO_x$ and $MoO_x$. Ammonium vanadate was used as precursor (0.1 g) and 17 g of oleylamine was following the standard procedure mentioned earlier. The diameter of the $VO_x$ NPs was about 1.4-2.0 nm. Each particle contained about 34-50 atoms.

EXAMPLE 3

Propylene Metathesis

Olefin metathesis is a popular and useful reaction. In the presence of certain transition-metal compounds, olefins exchange the groups around the double bonds, resulting in several outcomes: straight swapping of groups between two acyclic olefins (cross-metathesis), closure of large rings (ring-closing metathesis), formation of dienes from cyclic and acyclic olefins (ring-opening metathesis), polymerization of cyclic olefins (ring-opening metathesis polymerization), and polymerization of acyclic dienes (acyclic diene metathesis polymerization).

$WO_x$ on $SiO_2$ supports have been extensively investigated as catalysts for metathesis reactions due to their increased selectivity, resistance to poisoning and their ease in regeneration. However, conventional synthesis techniques lack control over delivering high concentrations of tetrahedrally coordinated $WO_x$ monomers and oligomers (Lewis acid sites) that are responsible for high metathesis activity. Thus, we sought to test our metal oxide nanoparticles for use in metathesis reactions.

For catalytic testing purposes, $WO_x$ nanoparticles were immobilized onto a $SiO_2$ support (as above), calcined and used for propylene metathesis. The main reaction in propylene metathesis is:

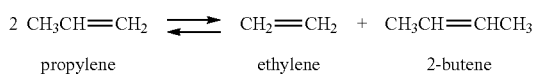

$$2\ CH_3CH{=}CH_2 \rightleftharpoons CH_2{=}CH_2 + CH_3CH{=}CHCH_3$$

propylene      ethylene      2-butene

However, some byproducts can also be produced as a result of reaction between the products (ethylene and 2-butene) with each other or with propylene to give higher molecular weight compounds. Cracking of these compounds can possibly occur as well.

The oleylamine suppressed $WO_x$ nanoparticle sintering during calcination, allowing for higher loadings of $WO_x$ species than is typically possible.

Nomenclature: The following nomenclature is used for the $SiO_2$ supported $WO_x$ nanoparticle samples. 1.6 nm $WO_x$ NP/$SiO_2$ for the samples synthesized without an oxidation agent and 1 nm $WO_x$ NP/$SiO_2$ for the samples using TANO. Conventional samples synthesized via dry impregnation are $WO_x$ NP/$SiO_2$. The calcination temperature for all samples was 600° C. and the loadings of $WO_x$ are given at the x-axis. Uncalcined samples were completely inactive due to the presence of oleylamine that blocks the active sites. Removal of the oleylamine generated active samples.

In order to correctly estimate the $WO_x$ (wt %) content for the $WO_x$ NP/$SiO_2$ samples, the organic content was corrected using thermogravimetric analysis (not shown). An oleylamine-AMT co-impregnated control sample was also prepared to verify the effect of unreacted oleylamine on the catalysts properties. This sample was completely inactive and had much lower surface area of the above samples, which suggested that free oleylamine (not as a ligand) has no effect in the catalytic activity.

Metathesis: The propylene metathesis activity of $SiO_2$ supported $WO_x$ NPs was tested on an isothermal downflow reactor at 300° C. and 1.06 atm. Each catalyst was pretreated with air for 1 hr at 320° C. and was cooled down to the reaction temperature under flowing ultra high purity (UHP) helium. A blend of 1% propylene and 1% argon (internal standard) in helium was passed through the reactor after establishing constant bypass propylene concentration. The outflow stream was kept at 70° C. and the reaction products were analyzed using a flame ionization detector (FID) normalized with the concentration of the internal standard measured by a thermal conductivity detector (TCD).

During propylene metathesis, no induction period was noticed. The propylene turnover rate (TOR) ($s^{-1}$) (propylene molecules converted to products per W-atom per unit time) were collected at t=5 min.

When evaluated for the gas-phase reaction of propylene metathesis, the TOR of the $WO_x$ NP/$SiO_2$ samples were found to be up to 2 times higher than conventionally prepared $WO_x$/$SiO_2$ (FIG. 7a). 1 nm $WO_x$ NP/$SiO_2$ is clearly the most active material with activity increasing with $WO_x$ loading on the $SiO_2$ support.

Figure 7:
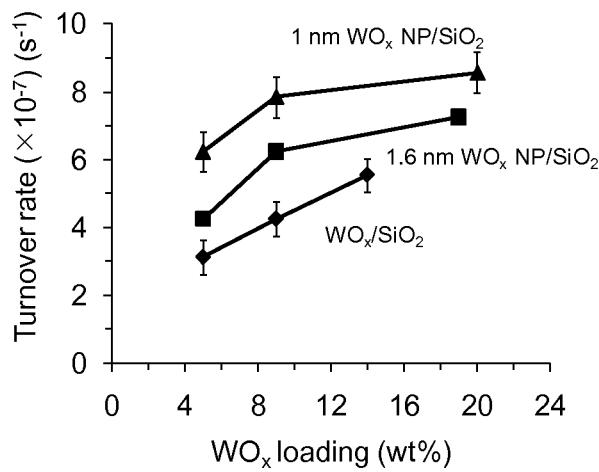
FIG. 7: Propylene metathesis selectivity profiles of 1.6 nm $WO_x$ $NP/SiO_2$, 1 nm $WO_x$ $NP/SiO_2$ and conventional $WO_x/SiO_2$ samples. Reactant gas was 1% propylene and 1% Argon in He. Reaction conditions: 300° C. at 1.06 atm. Y-axis: turnover rate: Complete conversion of propylene to any product. Selectivity: percent of propylene converted to ethylene and 2-butene (carbon mass balance). Metathesis turnover rate: Conversion of propylene to ethylene and 2-butene. X-axis: wt % loading of $WO_x$
Figure 7:
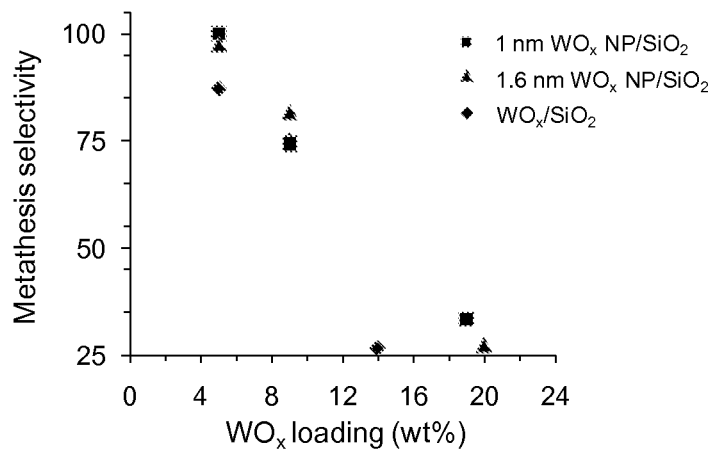
Figure 7:
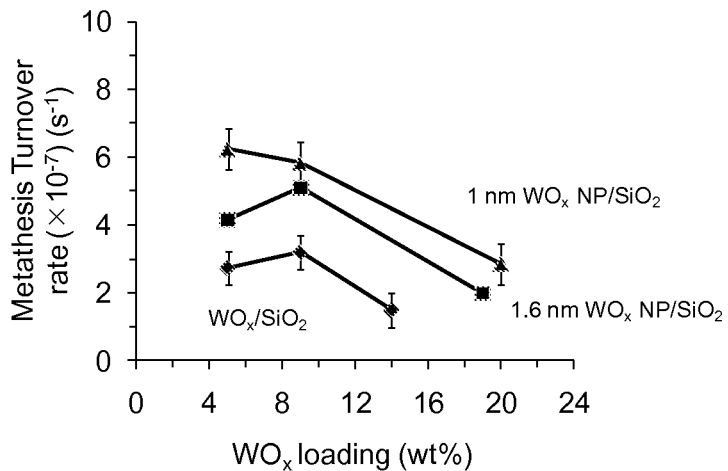

The $WO_x$ NP/$SiO_2$ samples were found to be more selective for ethylene/butylene metathesis products than conventionally prepared $WO_x$/$SiO_2$ (see FIG. 7b). The selectivity enhancement may be due to more desirable active sites provided by the smaller $WO_x$ domains in combination with residual oleylamine on the catalyst.

In FIG. 7c the metathesis TORs (Metathesis TOR=Metathesis Selectivity×TOR) for all materials are overlaid. It is clearly noticed that 1 nm $WO_x$ $NP/SiO_2$ is the best propylene metathesis series, up to 60% better than 1.6 nm $WO_x$ $NP/SiO_2$ and up to 150% better than conventional $WO_x/SiO_2$. It is very interesting to notice that upon deposition and calcination of the smallest $WO_x$ nanoparticles onto $SiO_2$, higher number of metathesis active sites are generated. These sites are possibly in the form of tetrahedrally coordinated $WO_x$ monotungstates and possibly smaller oligomers, which suggests further particle breakdown will occur. This will also be investigated in future work.

The following references are incorporated by reference in their entirety.

Lee, K.; Seo, W. S.; Park, J. T. Journal of the American Chemical Society 2003, 125, 3408-3409.

Zhang, H.; Feng, M.; Liu, F.; Liu, L.; Chen, H.; Gao, H.; Li, J. Chemical Physics Letters 2004, 389, 337-341.

Seo, J.-w.; Jun, Y.-w.; Ko, S. J.; Cheon, J. The Journal of Physical Chemistry B 2005, 109, 5389-5391.

Spahr, M. E.; Bitterli, P.; Nesper, R.; Mueller, M.; F., K.; Nissen, H. U. Angewandte Chemie International Edition 1998, 37, 1263-1265.

Spahr, M. E.; Stoschitzki-Bitterli, P.; Nesper, R.; Haas, O.; Novak, P. J. Electrochem. Soc. 1999, 146, 2780-2783.

Muhr, H. J.; Krumeich, F.; Schönholzer, U. P.; Bieri, F.; Niederberger, M.; Gauckler, L. J.; Nesper, R. Advanced Materials 2000, 12, 231-234.

Niederberger, M.; Muhr, H.-J.; Krumeich, F.; Bieri, F.; Gunther, D.; Nesper, R. Chemistry of Materials 2000, 12, 1995-2000.

Hudson, M. J.; Peckett, J. W.; Harris, P. J. F. Journal of Materials Chemistry 2003, 13, 445-446.

Lutta, S. T.; Dong, H.; Zavalij, P. Y.; Whittingham, M. S. Materials Research Bulletin 2005, 40, 383-393.

Viswanathamurthi, P.; Bhattarai, N.; Kim, H. Y.; Lee, D. R. Scripta Materialia 2003, 49, 577-581.

Gu, G.; Zheng, B.; Han, W. Q.; Roth, S.; Liu, J. Nano Letters 2002, 2, 849-851.

Phuruangrat, A.; Ham, D. J.; Thongtem, S.; Lee, J. S. Electrochemistry Communications 2009, 11, 1740-1743.

Zach, M.; Ng, K.; Penner, R. M. Science 2000, 290, 2120.

Zhou, J.; Xu, N.-S.; Deng, S.-Z.; Chen, J.; She, J.-C.; Wang, Z.-L. Adv. Mater. 2003, 15, 1835.

Zhou, W.; Ross-Medgaarden, E. I.; Knowles, W. V.; Wong, M. S.; Wachs, I. E.; Kiely, C. J. Nat Chem 2009, 1, 722-728.

The invention claimed is:

1. A method of making ultrasmall metal oxide nanoparticles, comprising;
  a) placing water soluble, inorganic ammonium oxometalate precursor in a reactor;
  b) adding an excess of amine surfactant to said reactor;
  c) optionally adding diols or amine oxides to said reactor;
  d) heating the reactor until the ammonium oxometalate precursor structure collapses and the nucleation stage generates ultrasmall metal oxide nanoparticles of average size ≤5 nm.

2. The method of claim 1, wherein the ultrasmall metal oxide nanoparticles have about 20-50 metal atoms per nanoparticle.

3. The method of claim 1 wherein the ammonium oxometalate precursor is selected from the group consisting of ammonium metatungstate, ammonium paratungstate, phosphotungstic acid hydrate, ammonium metamolybdate tetrahydrate, ammonium metavanadate, ammonium pentaborate octahydrate, ammonium hexachloroosmate(IV), ammonium chromate, ammonium perrhenate, ammonium dihydrogenphosphate, ammonium phosphomolybdate hydrate, ammonium hexachloroiridate(IV), ammonium tetrathiomolybdate, ammonium hexachloropalladate(IV), ammonium hexachlororhodate(III), and ammonium dichromate.

4. The method of claim 1, wherein the metal oxide is $WO_x$, $MoO_x$, $VO_x$ or a doped variation of $WO_x$, $MoO_x$, and $VO_x$.

5. The method of claim 1, wherein the amine surfactant is oleylamine.

6. An ultrasmall metal oxide nanoparticle, produced by the method of claim 1.

7. A method of making ultrasmall metal oxide nanoparticles, comprising;
  a) placing 1 part of water soluble, inorganic ammonium oxometalate precursor, which is fully oxidized and has structural stability up to about 250° C., in a reactor;
  b) adding 14-20 parts of oleylamine to said reactor;
  c) optionally adding 0-1 part 1,12-dodecandiol or 0-1 part of trimethylamine N-oxide (TANO) to said reactor;
  d) slowly heating the reactor at about 2° C./min while stirring under oxygen free conditions until the reactor reaches about 250-270° C.;
  e) holding the reactor temperature at about 250-270° C. for 1-3 hours until the ammonium oxometalate precursor structure collapses and the nucleation stage generates ultrasmall metal oxide nanoparticles of average size <5 nm and with about 20-40 metal atoms per nanoparticle.

8. The method of claim 7 further comprising: cooling the reactor to about room temperature and collecting said nanoparticles.

9. The method of claim 7 further comprising: precipitating the nanoparticles.

10. A method of claim 9, wherein precipitation is caused by acetone or ethanol or methanol-chloroform.

11. The method of claim 7, wherein the ammonium oxometalate precursor is selected from the group consisting of ammonium metatungstate, ammonium paratungstate, phosphotungstic acid hydrate, ammonium metamolybdate tetrahydrate, ammonium metavanadate, ammonium pentaborate octahydrate, ammonium hexachloroosmate(IV), ammonium chromate, ammonium perrhenate, ammonium dihydrogenphosphate, ammonium phosphomolybdate hydrate, ammonium hexachloroiridate(IV), ammonium tetrathiomolybdate, ammonium hexachloropalladate(IV), ammonium hexachlororhodate(III), and ammonium dichromate.

12. The method of claim 7, wherein the synthesis includes 0.5 part of 1,12-dodecandiol and the nanoparticles increase to rod-shapes of about 3-7 nm×20-60 nm.

13. The method of claim 7, wherein the synthesis includes 0.5 part of TANO and the nanoparticle size is 0.8-1.2 nm.

14. The method of claim 7, wherein the metal oxide is $WO_x$, $MoO_x$, $VO_x$ or a doped variation of $WO_x$, $MoO_x$, and $VO_x$.

15. The method of claim 7, wherein the average nanoparticle size is ≤2 nm with a relative standard deviation of <10%.

16. A $WO_x$, $MoO_x$, $VO_x$ nanoparticle composition, wherein said $WO_x$, $MoO_x$, $VO_x$ nanoparticles or doped variations thereof are of size ≤5 nm with a relative standard deviation of <10%.

17. The $WO_x$, $MoO_x$, $VO_x$ nanoparticle composition of claim 16, wherein said $WO_x$, $MoO_x$, $VO_x$ nanoparticles or doped variations thereof are of size about 2 nm with a relative standard deviation of <10%.

18. The $WO_x$, $MoO_x$, $VO_x$ nanoparticle composition of claim 16, wherein said $WO_x$, $MoO_x$, $VO_x$ nanoparticles or doped variations thereof are of size about 1 nm with a relative standard deviation of <10%.

19. A catalyst, comprising $WO_x$, $MoO_x$, $VO_x$ nanoparticles or doped variations thereof that are of size ≤5 nm with a relative standard deviation of <10% bound to a solid support.

20. The catalyst of claim 19, wherein said $WO_x$, $MoO_x$, $VO_x$ nanoparticles or doped variations thereof that are of size ≤2 nm with a relative standard deviation of <10%.

21. The catalyst of claim 19, wherein said $WO_x$, $MoO_x$, $VO_x$ nanoparticles or doped variations thereof that are of size ≤1 nm with a relative standard deviation of <10%.

22. A method comprising utilizing the catalyst of claim 19 in a metathesis reaction.

* * * * *